UNITED STATES PATENT OFFICE.

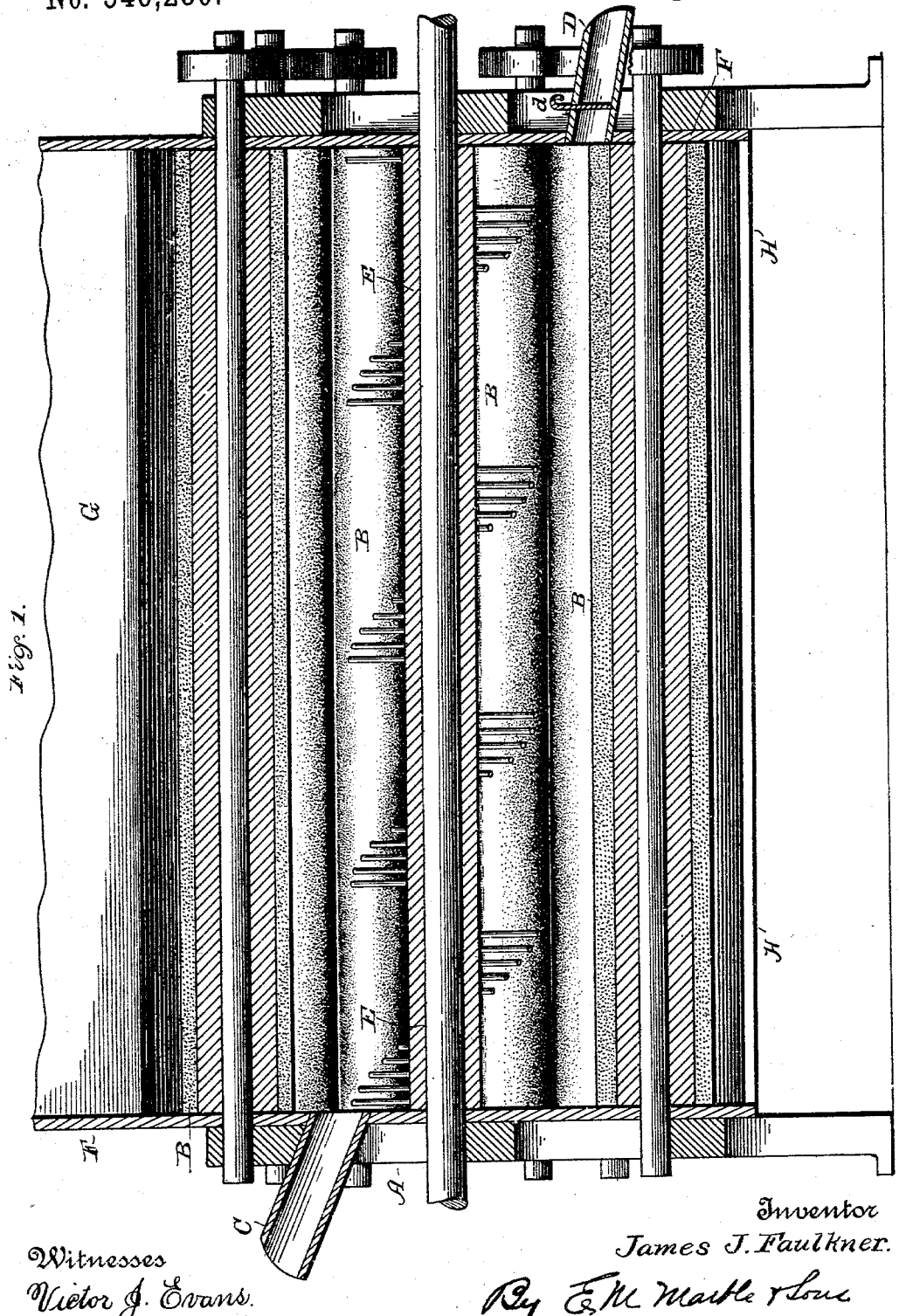

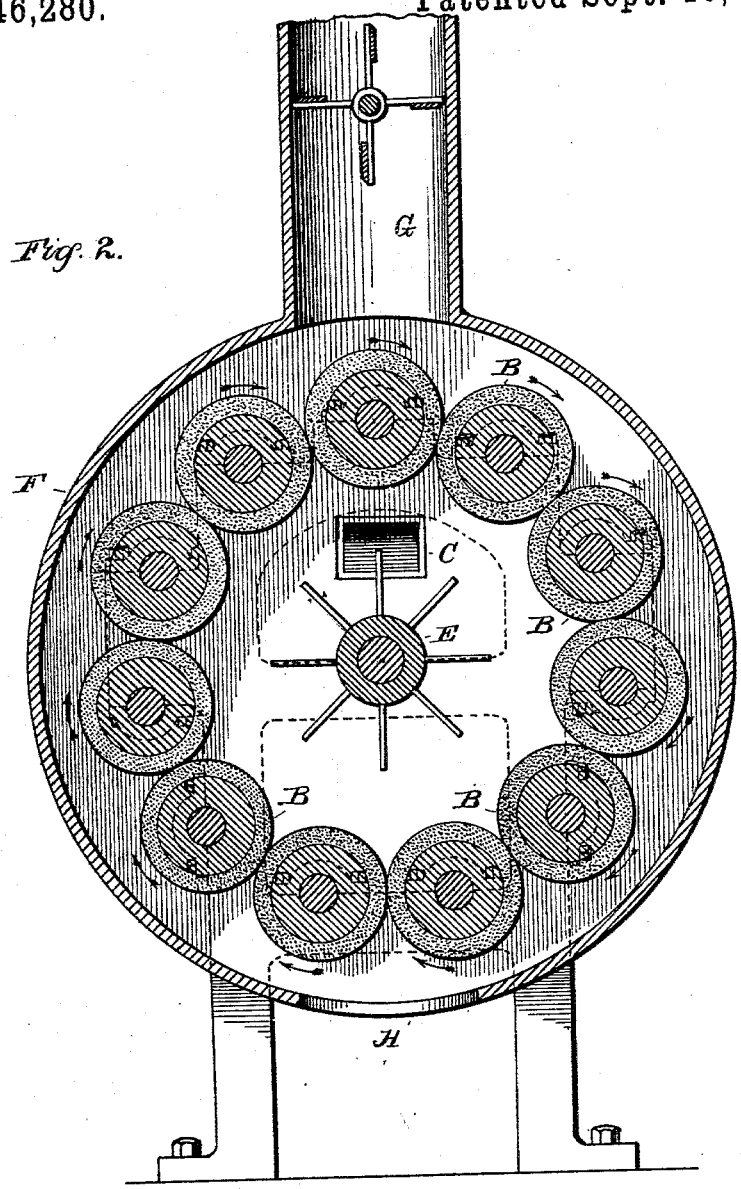

JAMES J. FAULKNER, OF MEMPHIS, TENNESSEE, ASSIGNOR, BY DIRECT AND MESNE ASSIGNMENTS, TO THE STANDARD COTTON SEED COMPANY, OF ARKANSAS.

COTTON-SEED DELINTER.

SPECIFICATION forming part of Letters Patent No. 546,280, dated September 10, 1895.

Application filed July 9, 1895. Serial No. 555,434. (No model.)

*To all whom it may concern:*

Be it known that I, JAMES J. FAULKNER, a citizen of the United States, residing at Memphis, in the county of Shelby and State of Tennessee, have invented certain new and useful Improvements in Cotton-Seed Delinters; and I do hereby declare the following to be a full, clear, and exact description of the invention, such as will enable others skilled in the art to which it appertains to make and use the same.

My invention relates to improvements in machines for treating cotton-seed, and particularly to improvements in that class thereof known as "delinters;" and it consists of the improved cotton-seed delinter whose construction and arrangement of parts will be hereinafter fully described, and particularly pointed out in the claims.

In an application for Letters Patent filed by me June 13, 1895, Serial No. 552,686, I have described a cotton-seed delinter in which the removal of the lint from the seed was effected by the treatment of the seed in an inclosure made by a series of positively-actuated rotating abrading-surfaces placed with their faces in sufficiently close proximity to prevent the passage of seed between the same and actuated so as to move in one direction. In the machine described in said application a series of rolls were arranged in the form of an arc of a circle, and the space between the end rolls was closed by a central delinting-cylinder, the construction being especially designed to permit the formation of a machine of great capacity by offering the possibility of using a large number of series of abrading-rolls around the same central abrading-cylinder. A machine of this class is scarcely economical when only one series of rolls are used in connection with the central abrading-cylinder, and thus is not fitted for use in places where only a small amount of seed can be obtained for treatment.

The object of my present invention is to provide a machine in which the same principle of operation is utilized as was utilized in the machine described in my prior application referred to, but which shall be much smaller in its capacity and will be suitable for use directly in connection with gins.

It consists in a circular series of abrading-rolls placed, as before, with their surfaces in sufficiently close proximity to prevent the passage of seed between the same and positively actuated, so that all of the series move in the same direction. The inclosure formed by the rolls is preferably made from eight to ten inches in diameter, although it may be varied within large limits, if desired.

My invention is fully described in the drawings which accompany and form a part of this application, in which the same reference-letters refer to the same or corresponding parts, and in which—

Figure 1 represents a central longitudinal section of my delinter. Fig. 2 represents a cross-section thereof.

Referring to the drawings, A represents the machine-frame. In this frame are supported in suitable bearings the abrading-rolls B, which are placed with their surfaces in sufficiently close proximity to prevent the passage of seed between the same and so that they form a complete circle. Each of the rolls is positively actuated in such a manner that rotation in the same direction of all the rolls is secured. The separate rolls may be actuated by separate belts, or a single belt connection with the power-shaft may be used.

The seed is fed into the machine at one end of the abrading-rolls through the feed-spout C, and is discharged from the same at the other end thereof through the discharge-spout D. The valve $d$ is used to regulate the discharge in accordance with the condition of the seed under treatment.

In order to insure the passage of the seed through the machine, I mount upon the central shaft an agitator E, the pins of which are arranged in the form of a spiral. This agitator, besides feeding or conveying the seed through the machine, serves the further purpose of constantly forcing the seed against the abrading-surfaces, so as to secure complete removal of the lint from the seed by the abrading-rolls. The abrading-rolls rotate at quite a high rate of speed and serve not only to remove the lint from the sides of the seed, but also to withdraw the lint removed from the seed from the inclosure. This is done as the rolls complete their revolution, the pieces of lint clinging to the abrading-surfaces being drawn out between adjacent rolls. The air-current sweeping over the outer surface of the rolls in the casing F draws the lint upward into the exhaust-flume G and discharges it at some suitable point. The coarse dirt and impurities, while removed from the surface of the rolls by the air-current, are not usually drawn up into the air-flume, but fall out of the casing through the opening H formed in the bottom thereof. While the rolls can thus remove from the inclosure formed thereby such substances as lint and leaves and the like, they are incapable of removing the seed from the inclosure or of injuring the seed in any manner. This is due to the fact that when the rolls are all caused to rotate in the same direction contiguous faces thereof move in opposite direction, so that the seed which is thrown into the angle formed by the meeting of two rolls instead of being injured by the meeting of the abrading-surfaces is thrown back into the inclosure without being injured in the slightest degree.

An especial feature of advantage in this machine lies in the fact that should any nails, spikes, or other like impurities happen to be fed into the inclosure with the seed no injury will take place to the machine thereby, as the spikes cannot be drawn out between the rolls, but will pass out of the discharge-opening with the cleansed seed.

The operation of my machine is as follows: The seed is fed into the machine through the feed-spout C, is at once thrown against the revolving abrading-surfaces by the agitator E, operating therein, the lint being stripped from the seed and drawn out by the rolls B as they complete their revolution. The seed itself is gradually fed to the discharge end of the machine by the agitator E, and is finally discharged in quantities regulated by its condition through the discharge-spout D. Before the seed is thus discharged all faces of the same come in contact with the abrading-surface, so that the surfaces of the seed as it is discharged are entirely clean and free from lint. The lint which is removed from the inclosure by the action of the abrading-rolls is swept away from their surfaces by the air-current existing in the surrounding casing F and passes out through the air-flume G. Leaves, bolls, and like impurities fall through the open bottom H of the casing.

Having thus fully described my invention, what I claim as new, and desire to secure by Letters Patent, is—

1. In a cotton seed delinter, the combination with a series of positively actuated abrading rolls, arranged in the form of a circle to form an inclosure within which the delinting operation takes place, and placed with their meeting surfaces in such close proximity that seed will not pass between the same, and means for causing said rolls to rotate in the same direction, of seed inlet and discharge openings, means for removing the lint separated by the action of the machine, and means for conveying the seed under treatment through the inclosure formed, substantially as described.

2. In a cotton seed delinter, the combination with a series of positively-actuated abrading rolls, arranged in the form of a circle to form an inclosure within which the delinting operation takes place, and placed with their meeting faces in such close proximity that seed will not pass between the same, and means for causing said rolls to rotate in the same direction, of seed inlet and discharge openings, means for causing an air current to sweep over the outer surface of said rolls, and means for conveying the seed under treatment through the inclosure, substantially as described.

3. In a cotton seed delinter, the combination with a series of positively-actuated abrading rolls, arranged in the form of a circle, and placed with their meeting faces in such close proximity that seed will not pass between the same, and means for causing said rolls to rotate in the same direction, of seed inlet and discharge openings, means for causing an air current to sweep over the outer faces of said rolls, and a spiral seed conveyer stationed within the inclosure formed by the rolls, substantially as described.

4. In a cotton seed delinter, the combination with a series of horizontally-arranged positively-actuated abrading rolls, arranged in the form of a circle, and placed with their meeting faces in such close proximity that seed will not pass between the same, and means for causing said rolls to rotate in the same direction, of a seed inlet opening at one end of the inclosure, a seed discharge opening at the other end thereof, means for causing an air current to sweep over the outer surface of said rolls, and a spiral conveyer stationed within the inclosure, substantially as described.

In testimony whereof I affix my signature in presence of two witnesses.

JAMES J. FAULKNER.

Witnesses:
R. W. RAMSEY,
JOHN HALLUM.